(12) United States Patent
Oberberger et al.

(10) Patent No.: US 9,483,905 B2
(45) Date of Patent: Nov. 1, 2016

(54) ULTRA-THICK GAMING DEVICE

(75) Inventors: Michael M. Oberberger, Reno, NV (US); Craig A. Paulsen, Reno, NV (US); Richard E. Rowe, Las Vegas, NV (US)

(73) Assignee: IGT, Las Vegas, NV (US)

( * ) Notice: Subject to any disclaimer, the term of this patent is extended or adjusted under 35 U.S.C. 154(b) by 1376 days.

(21) Appl. No.: 12/477,591

(22) Filed: Jun. 3, 2009

(65) Prior Publication Data

US 2010/0311505 A1  Dec. 9, 2010

(51) Int. Cl.
| | |
|---|---|
| G06F 15/16 | (2006.01) |
| G07F 17/32 | (2006.01) |
| H04L 29/06 | (2006.01) |
| H04L 29/08 | (2006.01) |

(52) U.S. Cl.
CPC ........... *G07F 17/3223* (2013.01); *G07F 17/32* (2013.01); *H04L 67/38* (2013.01); *H04L 67/04* (2013.01); *H04L 67/104* (2013.01); *H04L 67/12* (2013.01); *H04L 67/34* (2013.01); *H04L 69/329* (2013.01)

(58) Field of Classification Search
CPC ... G07F 17/32; G07F 17/3223; H04L 67/34; H04L 69/329; H04L 67/04; H04L 67/104; H04L 67/12
USPC .......................... 709/220–222, 205
See application file for complete search history.

(56) References Cited

U.S. PATENT DOCUMENTS

| | | | |
|---|---|---|---|
| 7,097,562 B2 | 8/2006 | Gagner | |
| 8,308,549 B2 | 11/2012 | Baerlocher et al. | |
| 8,447,870 B2* | 5/2013 | Gagner | 463/29 |
| 2002/0142846 A1* | 10/2002 | Paulsen | 463/43 |
| 2004/0132532 A1* | 7/2004 | Brosnan et al. | 463/42 |
| 2004/0203368 A1* | 10/2004 | Haller et al. | 455/41.2 |
| 2005/0282637 A1* | 12/2005 | Gatto et al. | 463/42 |
| 2006/0126611 A1* | 6/2006 | Kelly et al. | 370/389 |
| 2007/0032288 A1 | 2/2007 | Nelson et al. | |
| 2008/0248802 A1* | 10/2008 | Krishnamoorthy | 455/445 |
| 2008/0300046 A1 | 12/2008 | Gagner et al. | |
| 2009/0275402 A1* | 11/2009 | Backover et al. | 463/29 |
| 2010/0075714 A1* | 3/2010 | Keskar et al. | 455/556.1 |

OTHER PUBLICATIONS

Peachpit; Creating and Deploying Packages; Aug. 21, 2006; pp. 1-2.*

* cited by examiner

*Primary Examiner* — Oleg Survillo
(74) *Attorney, Agent, or Firm* — Neal, Gerber & Eisenberg LLP

(57) ABSTRACT

Systems, apparatus, and related methods for implementing services over a plurality of gaming devices in a mesh network. A plurality of gaming devices are situated in a mesh network. A gaming device includes a client processing module configured to provide play of one or more games of chance, and a mesh network interface configured to provide communications with a further one or more gaming devices. A gaming device also includes a server processing module configured to receive and transmit service data via the mesh network. The service data is independent of game play data for wagering on a game of chance at one or more of the gaming devices. The service data is capable of being stored at a gaming device and at the further one or more gaming devices to provide a level of redundant storage of the service data.

28 Claims, 5 Drawing Sheets

ULTRA-THICK GAMING DEVICE

BACKGROUND OF THE INVENTION

The present application relates in general to gaming devices and systems and, in particular, to methods and apparatus for providing services on networked gaming devices.

Casinos and other forms of gaming comprise a growing multi-billion dollar industry both domestically and abroad, with electronic and microprocessor based gaming machines being more popular than ever. Gaming machines may be placed in casinos, convenience stores, racetracks, supermarkets, bars and boats. Via a remote server, a gaming entity may provide gaming services in locale of a user's choosing, such as on a home computer or on a mobile device carried by the user.

Electronic and microprocessor based gaming machines can include various hardware and software components to provide a wide variety of game types and game playing capabilities, with such hardware and software components being generally well known in the art. For example, bill validators, coin acceptors, card readers, keypads, buttons, levers, touch screens, displays, coin hoppers, player tracking units and the like are examples of hardware that can be coupled to a gaming machine. Software components can include, for example, boot and initialization routines, various game play programs and subroutines, credit and payout routines, image and audio generation programs, security monitoring programs, authentication programs and a random number generator, among others.

The functions available on a gaming machine may depend on whether the gaming machine is linked to other gaming devices. For instance, when connected to other remote gaming devices, a gaming machine may provide progressive jackpots, player tracking and loyalty points programs, cashless gaming, and bonusing among other items. Many of these added components, features and programs can involve the implementation of various back-end and/or networked systems, including more hardware and software elements, as is generally known.

In a typical casino-based electronic gaming machine, such as a slot machine, video poker machine, video keno machine or the like, a game play is initiated through a wager of money or credit, whereupon the gaming machine determines a game outcome, presents the game outcome to the player and then potentially dispenses an award of some type, including a monetary award, depending upon the game outcome. In this instance, the gaming machine is operable to receive, store and dispense indicia of credit or cash as well as calculate a gaming outcome that could result in a large monetary award.

Over the years, wager-based gaming has evolved from stand-alone "one-arm bandits" with no electronics to today's electronic gaming machines, often interconnected and dependent upon a central server via a network in a casino or other gaming environment. With increasing services and operations being provided by a back-end server, such dependent gaming machines on the front-end are commonly referred to as "thin" clients of the server. Using thin-client gaming machines, players can enjoy a private gaming experience on some levels and shared experiences on other levels, for instance, by participating in progressive jackpots. Large numbers of people can use server-based gaming machines and participate in such networked gaming environments.

In a server-based gaming network, gaming machines, servers, and other devices communicate with one or more interconnected networks and are structured in a server-client configuration, where the server collects and distributes information from/to the various gaming devices. Additional advancements in recent years have included functionality enabling gaming devices to exchange information with other gaming devices for the purpose of shared, i.e. non-private, gaming experiences. Such advancements, however, have been limited to game- and player-oriented exchanges of information enabling multiple players to simultaneously play gaming devices and share bonuses and other game-oriented features. These sorts of communal and peer-to-peer group gaming experiences have gained in popularity.

With the addition in functionality and the greater dependence on a back-end server, casino floor uptime and system redundancy have become more of a concern. Gaming environments such as casinos are generally open for business 24 hours a day, 7 days a week. Thus, the gaming machines, servers, and particularly the gaming network itself need to be operational/online at all times. A power or communications link can result in the gaming machines being inoperable, a failure which would be inherently devastating to business. While it could be argued that certain other businesses face some similar problems, casinos are uniquely situated in that the gaming machines themselves are the revenue centers, such that the casinos often have one or more floors full of processing and memory power, i.e., in the gaming machines. Thus, there is a particular cost advantage to utilizing those gaming machines, as opposed to the redundant backup servers and other equipment that more traditional businesses use.

In the casino model, if the network goes down, or one or more servers (such as a bonus server or player tracking server) fail, thin-client gaming machines may not receive data and files necessary to operate, and can thus become unplayable. Moreover, in the thin client-server model, a variety of services are implemented and executed on the back end. For instance, player tracking, slot accounting, and other services are carried out on back-end servers, and all of these services require regular communications with client gaming machines over the network to be carried out properly. If the network goes down, all of these services can become problems.

Thus, in the conventional client-server model, more resources are required on the back-end servers to compensate for having less resources and services at the gaming machines. One conventional solution has been to use server farms, with multiple servers configured to provide the same information and operations, so that one server can compensate if another goes down. However, in this solution, regardless of how many back-end servers are provided, the gaming machines will still be inoperable if the entire network goes down. Another proposed solution has been to include logic at the gaming machines, allowing a player to play out the games and then re-sync with the back-end server when the network is back online. Such solutions require extra logic, processing power, and data storage at the gaming machines, thus defeating the purpose (to some degree) of relying on a back-end server in the thin client model. In addition, such solutions often involve significant effort to be managed properly, requiring extra time and cost on the part of the casino operator. In such conventional solutions, the network itself can become a significant cost burden, that is, attempting to compensate for the possibility of it going offline.

SUMMARY OF THE DESCRIBED EMBODIMENTS

According to one aspect of the present invention, a gaming system may comprise a number of host data processing devices, for instance, in the form of servers and/or gaming devices, each coupled to one or more gaming devices. The gaming devices, e.g., gaming machines, may be operable to provide wagering on an outcome of a game of chance, display the outcome of the game of chance, accept cash or an indicia of credit and dispense an award, such as cash or indicia of credit, to a player utilizing the gaming machine.

According to one aspect of the invention, a gaming system implements services over a plurality of gaming devices in a mesh network. A plurality of gaming devices are situated at respective network nodes of the mesh network. A gaming device includes a storage medium, a player interface, a client processing module configured to provide play of one or more games of chance responsive to receiving a wager from a player at the player interface, and a mesh network interface configured to provide communications at a respective network node with the mesh network. The mesh network interface is configured to transmit data to and receive data from a further one or more of the gaming devices at associated network nodes.

According to one aspect of the invention, a gaming device also includes a server processing module configured to: receive a data update signal, receive updated service data, and store, responsive to the data update signal, the updated service data in the storage medium as at least a portion of data of a service provided in a wagering environment. The service data is independent of game play data for wagering on a game of chance at one or more of the gaming devices. The server processing module is further configured to transmit, responsive to the data update signal, the updated service data to a designated further one or more of the gaming devices via the mesh network interface. The updated service data is capable of being stored at the further one or more gaming devices while being stored in the storage medium to provide a level of redundant storage of the service data.

In some implementations, the server processing module includes a security controller configured to determine whether the updated service data complies with one or more gaming regulations. Determining whether the updated service data complies with the one or more gaming regulations can include, for example, validation of one or more executable files or data files. The security controller can be further configured to send a message to one or more gaming devices in the mesh network, the message including instructions to suspend or disable play of the one or more gaming devices when the updated service data does not comply with the one or more gaming regulations. In some embodiments, the server processing module can also be configured to generate and output a report indicating results of one or more validation operations performed on the updated service data.

In some implementations, the server processing module includes an operations controller configured to: monitor operational characteristics of the mesh network, and adjust operational functions of one or more gaming machines in the mesh network in accordance with the monitored operational characteristics. For example, adjusting the operational functions can include determining a priority of the operational functions according to machine operability. Adjusting the operational functions can also include sending a message to the one or more gaming machines, the message including instructions to suspend one or more designated operational functions.

In some implementations, the client processing module is configured to store theme data and/or preference data in a memory device. For example, the preference data can include one or more items such as color data, brightness data, animation data, style data, and graphics data. The preference data can also include game preference data.

Depending on the desired implementation, the service data can include one or more executable blocks of data, for instance, player tracking executables, accounting executables, security executables, subscription executables, scheduling executables, authentication executables, cashless gaming executables, ticketing service executables, floor management executables, customer relations management (CRM) executables, virtual host executables, player preference executables, harm minimization executables, game management executables, third party service executables, and gaming regulation executables. The service data can also include one or more items of executable data such as bonusing executables, progressive executables, and tournament executables.

In some implementations, the service data can also include data files such as player tracking data, meter history data, accounting data, security event data, subscription data, scheduling data, protocol data, authentication data, cashless gaming data, ticketing service data, floor management data, customer relations management (CRM) data, virtual host data, player preference data, harm minimization data, and game management data. The service data can also include bonusing data, progressive data, and tournament data.

In some implementations, each network node is associated with a respective geographic location. Also, each network node is generally associated with a respective network address. The network nodes can be coupled via one or more wired and/or wireless connections. A first one or more of the network nodes can be geographically situated in a first gaming property, while a second one or more of the network nodes can be geographically situated in a second gaming property. The first gaming property and the second gaming property can be situated in different cities, states, or countries.

According to another aspect of the present invention, a method implements one or more services at a gaming device in a mesh network having a plurality of network nodes. Play of one or more games of chance is provided responsive to receiving a wager from a player at a player interface. Communications at a network node is provided with the mesh network via a mesh network interface. The mesh network interface is configured to transmit data to and receive data from a further one or more gaming devices at associated network nodes. A data update signal is received, and updated service data is received. Responsive to the data update signal, the updated service data is stored in a storage medium as at least a portion of data of a service provided in a wagering environment, the service data independent of game play data for wagering on a game of chance. Also responsive to the data update signal, the updated service data is transmitted to a designated further one or more of the gaming devices via the mesh network interface. The updated service data is capable of being stored at the further one or more gaming devices while being stored in the storage medium to provide a level of redundant storage of the service data.

Another aspect of the invention pertains to computer program products including a machine-readable medium on which are stored program instructions for implementing any of the methods described above. Any of the methods of this invention may be represented as program instructions and/or data structures, databases, etc. that can be provided on such computer readable media.

Aspects of the invention may be implemented by networked gaming machines, game servers and other such devices. These and other features and benefits of aspects of the invention will be described in more detail below with reference to the associated drawings. In addition, other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive methods, apparatus, and systems. These drawings in no way limit any changes in form and detail that may be made to the invention by one skilled in the art without departing from the spirit and scope of the present invention.

DETAILED DESCRIPTION OF SPECIFIC EMBODIMENTS

Figure 1:
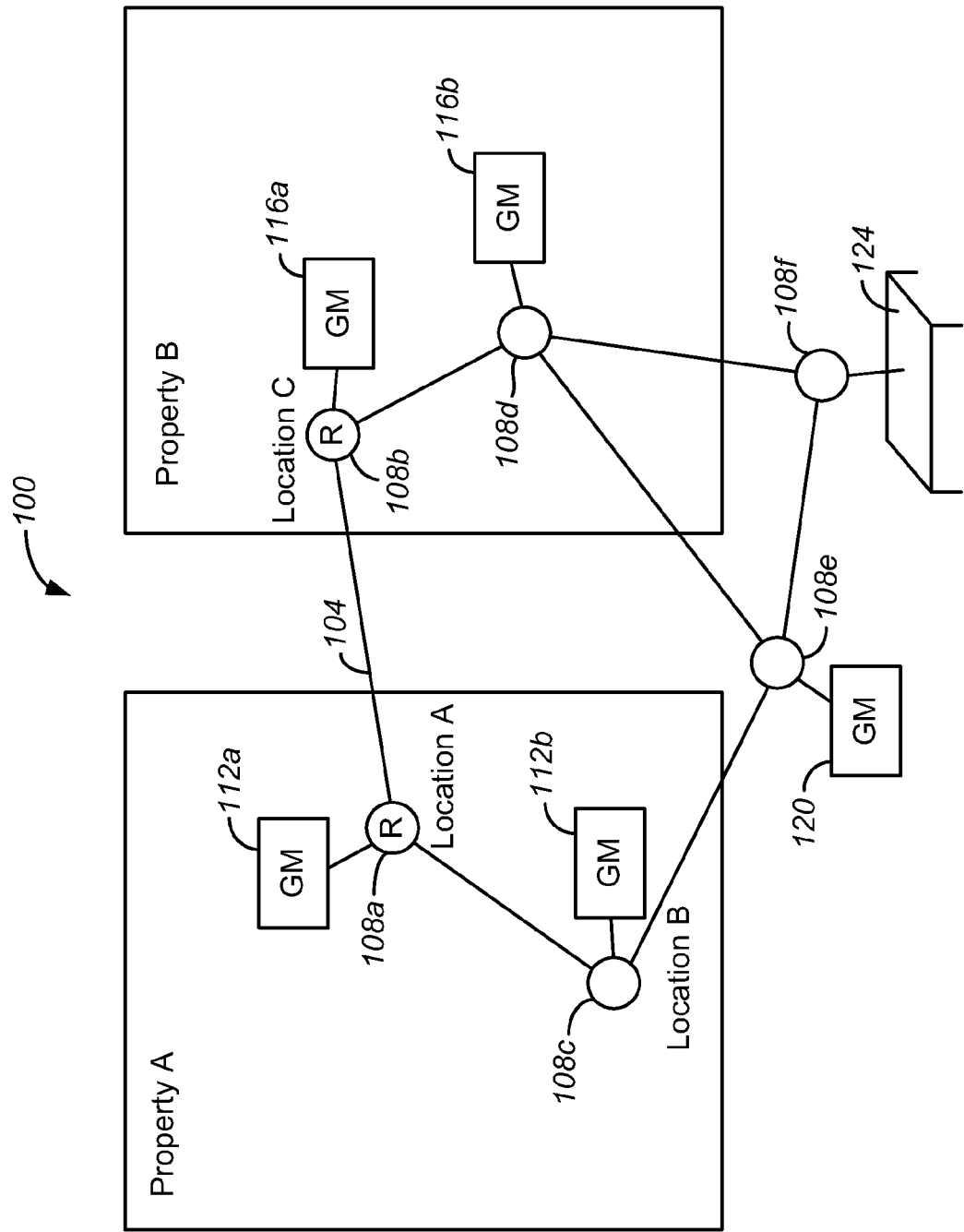
FIG. 1 shows a gaming system 100 for implementing services over a plurality of gaming machines in a mesh network, in accordance in with one embodiment of the present invention.

Exemplary applications of methods, systems, and apparatus according to the present invention are described in this detailed description. These examples are being provided solely to add context and aid in the understanding of the present invention. It will thus be apparent to one skilled in the art that the invention may be practiced without some or all of these specific details. In other instances, well known process steps have not been described in detail in order to avoid unnecessarily obscuring the present invention. Other applications are possible, such that the following examples should not be taken as definitive or limiting either in scope or setting.

In this detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

Although the present invention is directed primarily to gaming machines and systems, it is worth noting that some of the apparatus, systems and methods disclosed herein might be adaptable for use in other types of devices, systems or environments, as applicable, such that their use is not restricted exclusively to gaming machines and contexts. Such other adaptations may become readily apparent upon review of the inventive apparatus, systems and methods illustrated and discussed herein.

Methods and apparatus applicable to various gaming system configurations and their associated components are described. The gaming systems may comprise a network infrastructure for enabling one or more hosts to communicate with gaming machines. The gaming machines may be operable to provide wagering on a game of chance. A plurality of gaming devices, such as bill/ticket validators, printers, mechanical displays, video displays, coin hoppers, light panels, input buttons, touch screens, key pads, card readers, audio output devices, etc., may be coupled to the gaming machine. The gaming devices may be controlled by a master gaming controller executing authenticated software to provide a gaming interface for a game play experience on the gaming machine.

Gaming machines and devices constructed in accordance with embodiments of the present invention provide, in some aspects, self-contained gaming environments that automatically attach to other similar devices to share and communicate information without the need for a backend server system and/or a fully redundant network of machines. According to some embodiments of the present invention, a self-configuring mesh network interconnects the gaming machines, ensuring that the network continues to operate even when one or more gaming machines go offline. In some embodiments, the machines are able to communicate with one another and share resources until the network goes back online.

In some embodiments, gaming machines constructed in accordance with embodiments of the present invention can be characterized as "ultra-thick," in that they operate as gaming entertainment nodes that attach to and communicate with other such nodes to create a dynamic, self-configuring system based upon the activity on each such node. The resultant system treats each gaming node on the network as an encapsulated gaming environment while enabling each node to interact with any other node in the network, defining a mesh network of nodes within a particular casino or across multiple casinos or gaming properties.

In one implementation, the gaming environment within each node is comprised of a self-contained client-server architecture wherein the client of the node handles the intra-node player's game experience while the server of the node handles the game management, player and inter-node communication. In one implementation, a client node within a gaming entertainment node may be theme oriented or preference oriented or both. A predefined configuration of the node environment can maintain the theme orientation or preferred presentation of the node irrespective of game type. For instance, a theme for a node could be an "over 40" node which configures the available games on the node to specific colors, brightness, animation styles, graphics, etc to maintain the theme of those characteristics highly desirable for someone over age 40. Another example could be related to a preferred game set such as board games, TV shows, movie themes, or other such preferences.

Server nodes within the mesh network share, exchange, and replicate the server node information with designated other gaming entertainment nodes within the network. In this way, each server node can be redundant with other node servers in the network, eliminating the need for a central server to collect node information and ensuring that the mesh network will not experience down time. While one or more nodes may go down, the mesh network of nodes will be maintained.

Applying principles of the present invention, as disclosed herein, complete and operable services can be implemented exclusively across gaming machines in a mesh network. Such services include, for example, complete versions of player tracking systems and databases, meter histories, accounting systems, security event monitoring and histories, bonusing services, progressive bonusing, tournaments, subscriptions, e.g., automated messages alerting a player of certain events such as a progressive jackpot reaching a certain amount, scheduling services, protocols, authentication, electronic funds transfer (EFT)/cashless gaming, ticketing services and databases, floor management services, visualizations, customer relationship management (CRM), virtual hosts, player preferences, gaming machine games, table gaming, harm minimization/responsible gaming, and other traditionally network services and management. Such services can be entirely implemented on the gaming machines themselves.

According to embodiments of the present invention, gaming machine(s) themselves provide both gaming services and the traditionally back-end infrastructure that no longer requires network access to a back-end server. Thus, gaming machines interconnected in accordance with principles of the present invention are not reliant on a back-end server to provide players with all of the gaming and services available in client-server gaming networks. A gaming machine can connect with a variety of other gaming machines coupled to the mesh network to cooperate and share information to provide the various services.

"Mesh networks" are understood by those skilled in the art to refer to mechanisms for routing data between nodes of the network. As applied in the context of embodiments of the present invention, mesh networking allows for continuous connections and reconfiguration around broken or blocked paths by "hopping" from node to node until the destination is reached. Mesh networks differ from other networks in that the component parts can all connect to each other via multiple hops. Mesh networks are also considered to be self-healing: the network can still operate even when a node breaks down or a connection to the node fails. As a result, a reliable network of nodes is formed. Mesh networks can be implemented in accordance with embodiments of the present invention, in-part or in-whole, as wireless networks, wired networks, combinations thereof, and as software interactions.

As used herein, part or all of a mesh network can be implemented using various topologies. One topology is the "full" or "fully connected" type in which each of the nodes of the network is connected to each of the other nodes in the network with a point-to-point link. This makes it possible for data to be simultaneously transmitted from any single node to the other nodes. Another type is the "partial" or "partially connected" topology in which some of the nodes of the network are connected to more than one other node in the network with a point-to-point link. This makes it possible to take advantage of some of the redundancy that is provided by a physical fully connected mesh topology without the expense and complexity required for a connection between every node in the network.

Implementations of the present invention over mesh networks often include the definition and execution of intelligent routing algorithms and protocols. The mesh network provides multiple paths from source to destination, and intelligent routing algorithms allow each node in the network to make a determination as to which path to forward packets through the network, in order to improve performance. If the link between a pair of nodes along one of the paths is congested, for example, then the routing algorithms are configured to establish another path that avoids the congested link. Also, if a node goes down, an alternate route is chosen based on the routing algorithms. Thus, in networks that are based upon the physical partially connected mesh topology, for instance, the data that is transmitted between nodes in the network takes the shortest path (or an approximation of the shortest path) between nodes, except in the case of a failure or break in one of the links, in which case the data takes an alternate path to the destination. The nodes of the network possess an appropriate logical routing algorithm to determine the correct path to use at any particular time.

Embodiments of the present invention also provide dynamic configuration for load-balancing of the mesh network. For instance, embodiments of the present invention provide operations including automated discovery of new nodes in the mesh network, registration of the newly discovered nodes, and adjusting node characteristics to reduce or eliminate possible dense mesh network effects. These effects can occur when nodes are simultaneously rebroadcasting messages in a small region on the same channel, and the nodes interfere with each other. Ultimately, the interference may result in unacceptable message latency or in some nodes not receiving the broadcast messages. Aspects of the present invention are capable of addressing this dense mesh network dilemma, so that new nodes may be more readily and accurately discovered and registered.

In another embodiment, in which dynamic node configuration is implemented, methods performed in accordance with embodiments of the present invention include the steps of monitoring the formation of nodes, capturing and storing the history of such node formations in suitable form on a recordable storage medium, for instance, situated at one of the gaming machines/nodes of the mesh network. In some implementations, as described herein, such historical data can also be checked for conformance with security and regulatory requirements.

FIG. 1 shows a gaming system 100 for implementing services over a plurality of gaming machines in a mesh network, in accordance in with one embodiment of the present invention. A mesh network 104 is provided over one or more gaming properties, in this embodiment, the two properties designated as property "A" and property "B." The mesh network 104 includes a plurality of nodes 108a-f situated at identifiable network locations in mesh network 104, and geographically situated across properties A, B, and other gaming environment locations outside of properties A and B. The various connections between nodes 108a-f can be implemented using wired, wireless, and combinations of wired and wireless couplings between the various nodes in the mesh network, depending on the desired implementation.

In one implementation, one or more nodes in the mesh network 104 are in communication with another network, such as a local gaming network, or wide area network such as the Internet. Such other networks can be associated with third parties, for instance, businesses providing additional services to the players. For example, in one embodiment, all or a portion of the mesh network 104 is implemented as a peer-to-peer wireless network in which participant nodes/gaming machines cooperate with one another to route packets. These and other clients can connect to the mesh nodes and use the backbone to communicate with one another over large distances and with nodes on the Internet to provide additional promotions and programs in which the players can participate.

In another embodiment, one or more mesh networks implemented locally, for instance, in specific gaming properties, can be connected with one another via the Internet. In this embodiment, various gaming properties located across a city, state, country, and/or the world can be individually viewed as "micro" mesh networks, which interface with one another via the Internet to define a "macro" mesh network. In such embodiments, when a given micro-mesh network is over-utilized or under-utilized, as the case may be, one or more other micro-mesh networks at various locations can provide resources for load balancing.

In another implementation, the mesh network 104 is integrated with a cloud computing network, for instance, provided over the Internet as described above. In one embodiment, for example, additional bandwidth and storage capacity can be provided as a service in the cloud computing network, and made available on demand to the mesh network 104 as it dynamically adjusts during operation. These services can be provided internally or externally from a third party in the cloud computing network, and made dynamically scalable and virtualized as part of the cloud computing services. In this way, such services can be made available and complement the dynamic adjustability of the mesh network 104, in the implementations described herein.

In FIG. 1, one or more gaming machines/devices are situated at respective nodes 108a-108f in mesh network 104. The gaming devices include gaming machines 112a and 112b at property A, gaming machines 116a and 116b at property B, gaming machine 120 situated in another gaming environment, such as a hotel or airport, and table game 124 at node 108f, located in a gaming environment such as a casino. The geographic locations of the gaming devices and nodes can vary, in accordance with embodiments of the present invention, depending on the desired implementation. In addition, those skilled in the network arts will appreciate that, while the gaming devices and respective nodes are illustrated in FIG. 1 as separate elements, the gaming devices themselves can include suitable hardware, software, and interfaces to themselves define the respective nodes 108a-f of mesh network 104.

In FIG. 1, as described herein, players interested in participating in various services provided across mesh network 104 can register directly at gaming devices in the network. In one embodiment, predetermined nodes, such as network nodes 108a and 108b, can be designated to provide such registration services. Thus, in the embodiment illustrated in FIG. 1, a player wishing to sign up for such services can be instructed by casino attendants to use such designated gaming machines, namely machines 112a and 116a, which are situated at respective registration nodes 108a and 108b. On-screen instructions and interfaces can instruct and assist the player in entering the necessary personal information and other data to register for one or more services, as described herein. Once established, the entered player information can be replicated throughout the node network. In one example, when a floor is configured with a specific game-node layout, each node may be location aware, enabling the operator to use a game set-up node to establish the node layout. Upon completion, the node information is replicated then executed for each node within the network based on its location within the network.

Figure 2:
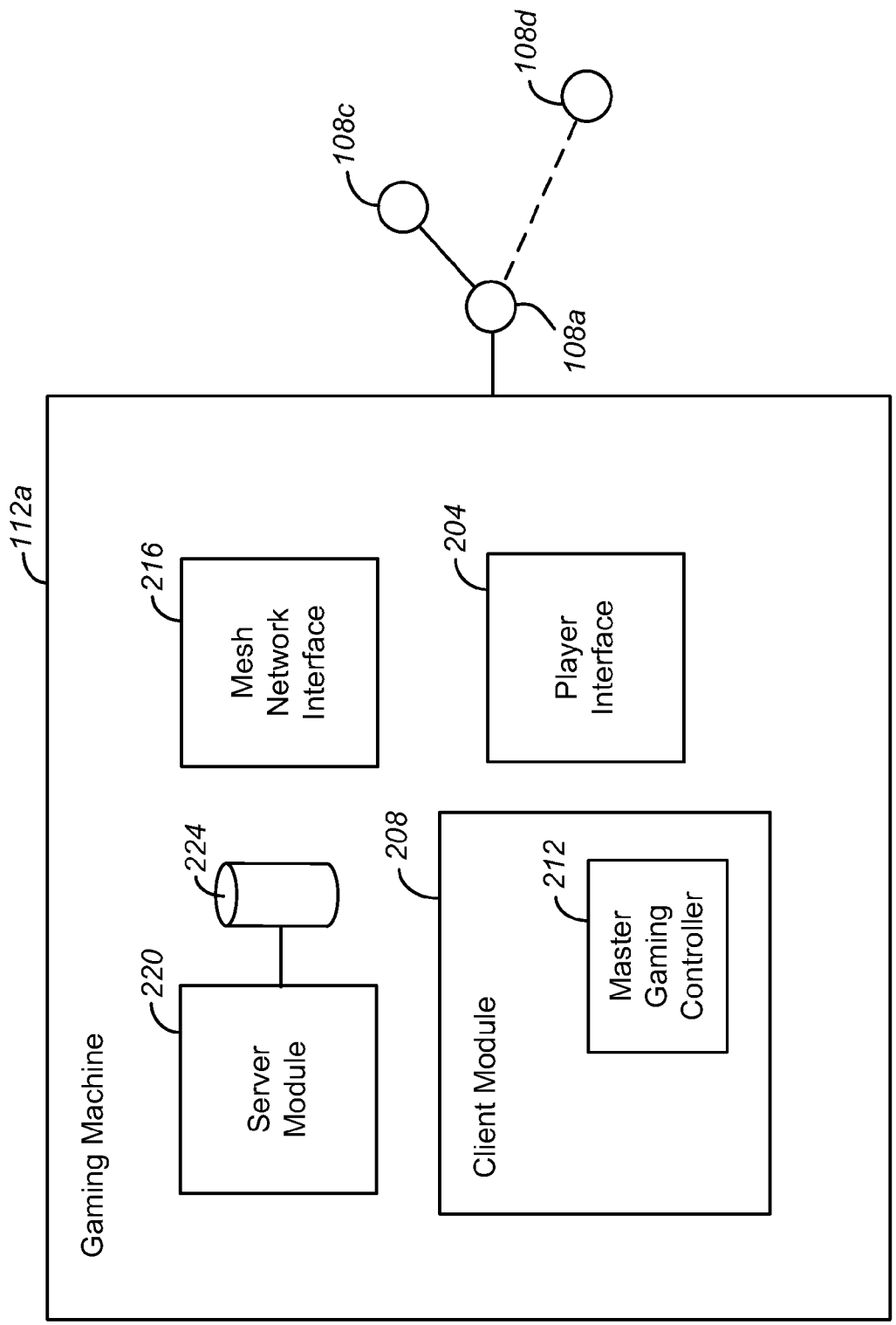
FIG. 2 shows a block diagram of a gaming device such as machine 112a of system 100, constructed in accordance with one embodiment of the present invention.

FIG. 2 shows a block diagram of a gaming device such as machine 112a of system 100, constructed in accordance with one embodiment of the present invention. Gaming machine 112a has a network location at node 108a which, in turn, is in communication with one or more other nodes in mesh network 104, such as node 108d by virtue of a wireless connection and node 108c by virtue of a wired connection.

In FIG. 2, gaming machine 112a includes a player interface unit 204, which includes player interface devices described herein, such as a display screen, one or more information panels, a touch screen, one or more button panels, and other player I/O mechanisms such as bill acceptors and ticketing devices. In FIG. 2, gaming machine 112a further includes a client processing module 208 configured to provide play of one or more games of chance on gaming machine 112a. Generally, to this end, client module 208 includes a master gaming controller 212 operable to provide plays of selected games of chance responsive to receiving wagers from players at player interface 204.

Gaming machine 112a further includes a mesh network interface 216 configured to provide communications with mesh network 104 at network node 108a, as illustrated in FIG. 2. In particular, mesh network interface 216 is configured to transmit data to and receive data from one or more other gaming devices, as shown in FIG. 1, at their associated network nodes 108a-f.

In FIG. 2, client processing module 208 is configured to store theme data for gaming machine 112a in a suitable memory device. In addition, in one embodiment, client module 208 is configured to store preference data in one or more addressable locations of the memory device or a different memory device. Examples of such preference data include color data, brightness data, animation data, style data, and graphics data. One or more of such data types can individually or in combination be provided to change the visual and/or audio presentation of games at gaming machine 112a.

In FIG. 2, gaming machine 112a further includes a server processing module 220 in communication with a storage medium 224. Server module 220 is configured to store various types of service data received from other gaming devices in mesh network 104 in storage medium 224. In addition to receiving such information via mesh network interface 216, server module 220 is configured to transmit such service data to other gaming devices on mesh network 104 via mesh network interface 216. In this way, a desired level of redundant storage of such service data can be provided in mesh network 104, as described herein.

Figure 3:
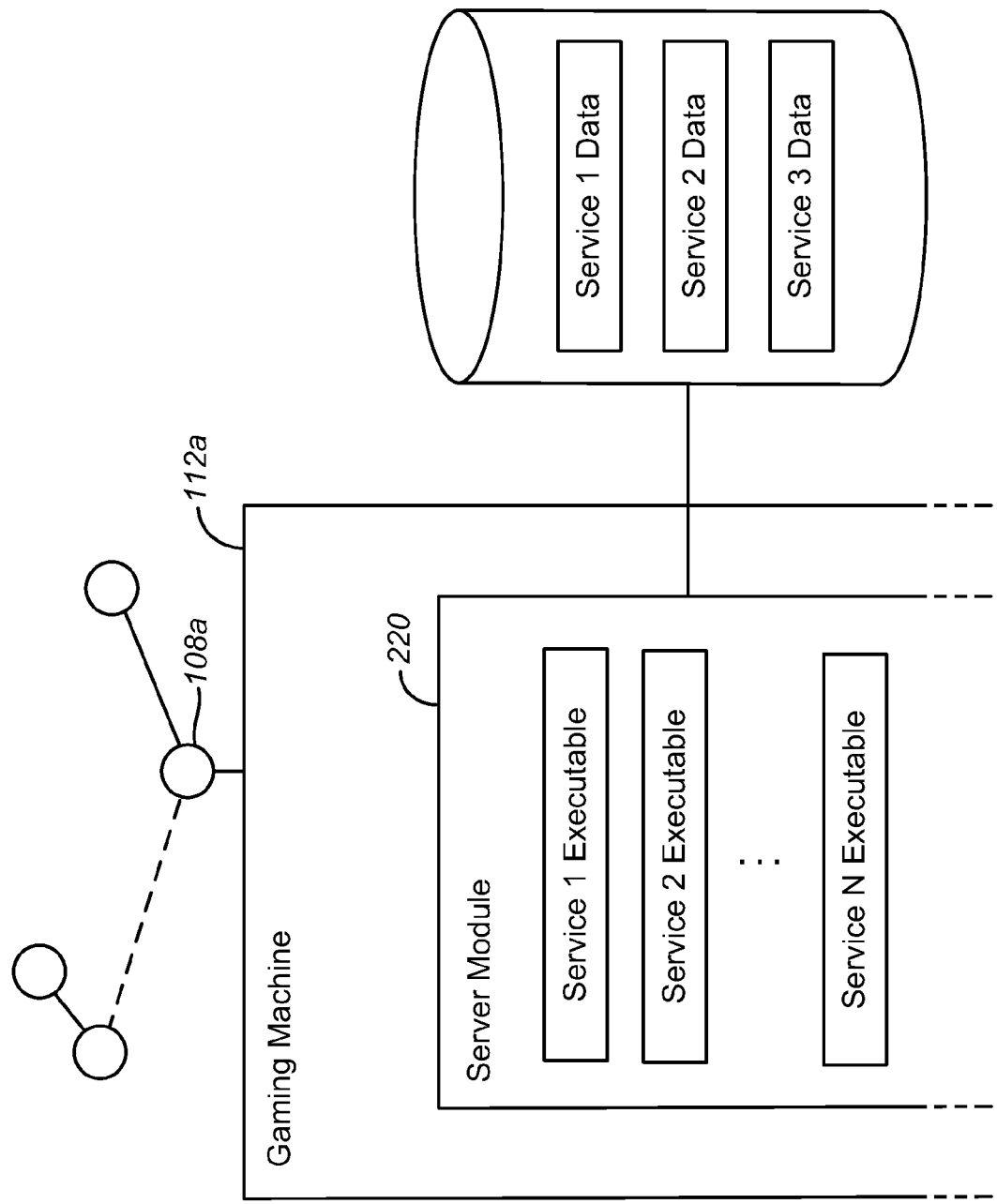
FIG. 3 shows a block diagram of gaming machine 112a, focusing on one implementation of server module 220, in accordance with embodiments of the present invention.

FIG. 3 shows a block diagram of gaming machine 112a, focusing on one implementation of server module 220, in accordance with embodiments of the present invention. In FIG. 3, server module 220 is configured to store executable blocks of data associated with respective services 1-N, made available over mesh network 104. In this embodiment, service data is categorized as "executable," in that one or more blocks of such data associated with a respective service can be executed to perform that service over mesh network 104. In one embodiment, data handled by such executable files is stored at separate memory addresses, for instance, in storage medium 224. In one embodiment, storage medium 224 is located external to gaming machine 112a but still in communication with server module 220.

In FIG. 3, separate services 1-N are illustrated as separate blocks of executable files and corresponding blocks of data in module 220 and medium 224, respectively. Such organization is intended for illustrative purposes only, as the data can be organized in various ways. For instance, a number of executable files for service 1 or other services provided over mesh network 104 can be organized and stored as desired to provide efficient retrieval and execution of such files. Often, a multitude of executable files corresponding to a single service are provided to implement that service. The same holds true for data files or blocks 1-N situated in storage medium 224. Various organizations and storage of such executable files and data to be manipulated by such files can be provided in accordance with embodiments of the present invention.

FIG. 3 shows one illustration of the organization of executables and corresponding data files at a single gaming machine or device in mesh network 104. As described herein, copies of such data are often provided at other devices in network 104 at the same time as being stored in gaming machine 112a to provide a desired level of redundant storage of such data.

A number of various services provided by back-end servers in conventional gaming systems and networks are implemented across one or more gaming devices in mesh network 104, without the need for such back-end infrastructure, in accordance with embodiments of the present invention. Examples of executable files to implement one or more services across mesh network 104 include player tracking executables, accounting executables, security executables, subscription executables, scheduling executables, authentication executables, cashless gaming executables, ticketing service executables, floor management executables, customer relationship management (CRM) executables, virtual host executables, player preference executables, harm minimization executables, and game management executables. In addition, other services having such executables files include bonusing services, progressive services, and tournament services, such services being related more to gaming activity in the gaming environment.

The various executable files associated with the services described above can have corresponding data files to be manipulated and processed by those executable files.

Figure 4:
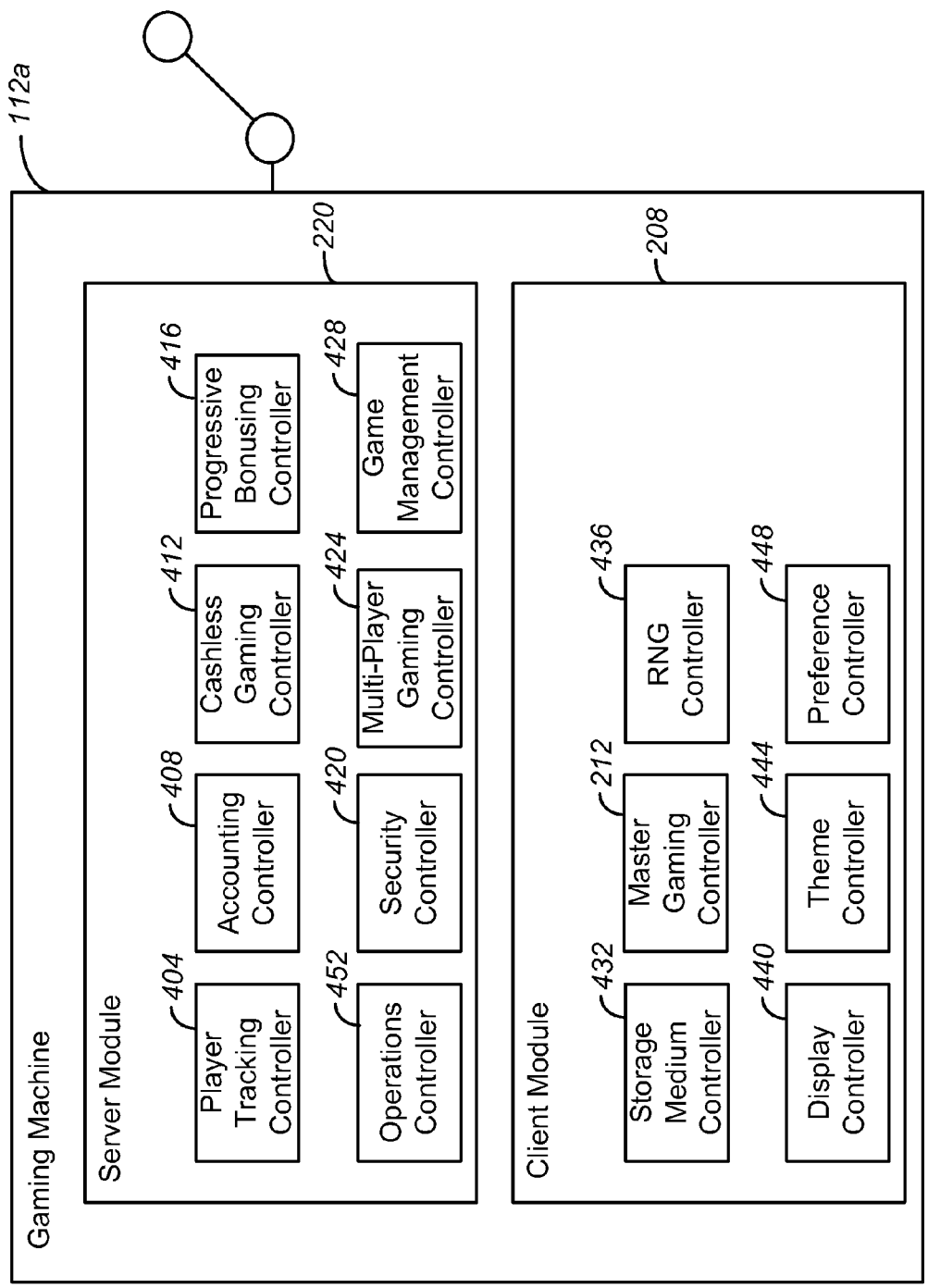
FIG. 4 shows a block diagram of gaming machine 112a, constructed according to an alternative embodiment of the present invention.

FIG. 4 shows a block diagram of gaming machine 112a, constructed according to another embodiment of the present invention. In FIG. 4, gaming machine 112a is constructed to have a server processing module 220 and a client processing module 208, both of which are described above. In this embodiment, processing modules 220 and 208 each have a plurality of controllers within, as shown in FIG. 4. In one embodiment, each service provided by gaming machine 112a in mesh network 104 has a dedicated controller or processing device to implement that service. Thus, in one embodiment, as shown in FIG. 4, server module 220 includes a dedicated player tracking controller 404 providing player tracking services, an accounting controller 408 providing accounting services, a cashless gaming controller 412 to provide cashless gaming services, a bonusing and/or progressive controller 416 providing bonusing/progressive services, a security controller 420 providing security services, a multi-player gaming controller 424 providing multi-player gaming, and a game management controller 428 providing game management services.

In FIG. 4, client module 208 of gaming machine 112a includes its own dedicated controller devices, in particular, storage medium controller 432 to provide control of one or more storage mediums in communication with client module 208, master gaming controller 212, a random number generator (RNG) controller 436 operable to generate and output random numbers for various games and applications, a display controller 440 operatively coupled to control one or more display devices of gaming machine 112a, a theme controller 444 operable to output and control the presentation of themes and theme-related data on gaming machine 112a, and a preference controller 448 operable to receive, process, and output preference information at various stages of interaction with a player at gaming machine 112a. One example of such preference data is game preference data input by the player. Other assignments of service executables to one or more controllers in server module 220 or client module 208 can be implemented consistent with the spirit and scope of the present invention.

Figure 5:
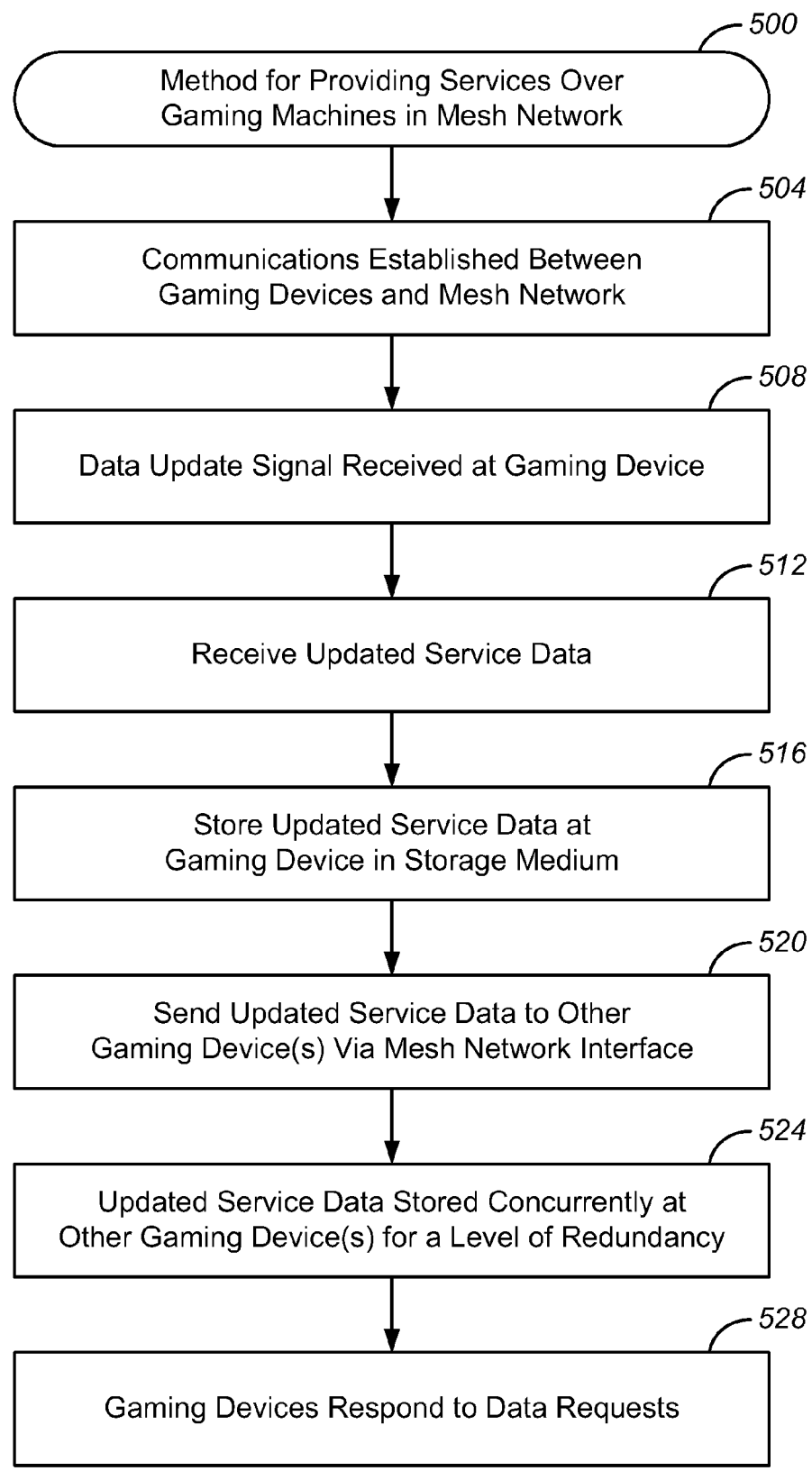
FIG. 5 shows a flow diagram of a method 500 for providing services over gaming machines in a mesh network, performed in accordance with one or more embodiments of the present invention.

FIG. 5 shows a flow diagram of a method 500 for providing services over gaming machines in a mesh network, performed in accordance with one or more embodiments of the present invention. The method 500 begins in step 504 in which communications are established and maintained between gaming devices and mesh network 104. In one embodiment, a data update signal is transmitted by a gaming machine in network 104. For example, such a data update signal can be transmitted when data to be processed by one or more of the services described herein is updated at one of the gaming machines/nodes in the network. In another example, such a data update signal is transmitted when updated executable files for performing one or more services described herein are provided at one of the gaming devices in the network, e.g. from a server.

In FIG. 5, in step 508, when a data update signal is transmitted and received at a gaming machine, the method proceeds to step 512. In step 512, updated service data, in the form of one or more executable files and/or one or more data files to be processed, is provided to the gaming machine via mesh network interface 216. Such updated service data can be transmitted together with or apart from the update signal.

In FIG. 5, when the updated service data is received at mesh network interface 216 of the gaming machine, such data is preferably stored at the gaming machine in an appropriate storage medium. For example, executable files can be stored in a flash memory or cache proximate server processing module 220 for fast retrieval and execution by a controller, such as one of the dedicated controllers described with respect to FIG. 4. Data to be processed by such service executables can be stored in a suitable memory location, such as storage medium 224.

In FIG. 5, the method proceeds from step 516 to step 520, in which such updated service data is sent from one gaming machine to other gaming machines for replication on mesh network 104 via mesh network interface 216. In step 524, when such updated service data is received at one or more other gaming devices, the service data can be similarly stored in suitable memory devices at such machines while being stored at the gaming device which sent the data. In this way, a desired level of redundancy of the service data can be provided across mesh network 104.

In FIG. 5, in step 528, when requests for such data are transmitted by one or more devices across mesh network 104, one or more gaming devices storing such data can respond with the requested data.

Certain embodiments of the present invention also provide for enhanced authentication and security. In these embodiments, the mesh network is constructed with an authentication/security layer on top of the communications protocols provided by the mesh network. In this way, embodiments of the present invention also provide for enhanced compliance with gaming regulations, for instance, as governed by individual states in the United States. In Nevada, for example, system-based games must be capable of verifying that all control programs contained on the server or system portion are authentic copies of approved components of the gaming device. To this end, gaming machines in the mesh network include mechanisms to determine that executable files and data downloaded to the gaming machine, for instance, from another networked gaming machine, or a separate client or server, are authentic, complete, and without modification. In one embodiment of the present invention, one or more designated gaming machines in the network are configured to check the authentication of such control programs.

For instance, returning to FIG. 4, security controller 420 of server module 220 can be configured to perform such authentication operations, as discussed herein. In one embodiment, the security controller 420 is configured to validate software and data downloaded to the gaming machine 112a in which controller 420 is situated and, in some embodiments, software and data located at other gaming machines in the mesh network. In one embodiment, one or more designated security controllers 420 are capable of executing commands and sending messages to other gaming machines in the network to cause those machines to validate downloaded software. The security controller 420 can be configured to send a message to the master gaming controller of one or more such machines, the message including instructions to suspend or disable play of the gaming machine when the validation is unsuccessful.

In one embodiment, security controller 420 is configured to perform a bit-for-bit comparison and prevent the execution of any control program component if the component is determined to be invalid. A visual notification of the invalid program can be generated and output for display on a display of the gaming machine(s) or a server. A verification mechanism including one or more program modules is retrieved from a storage medium coupled to the mesh network and executed by a suitable processor on the gaming machine to provide the desired level of authentication. In one embodiment, a report is generated that provides details of the outcome of each automated execution of the validation mechanism and shall identify any program components determined to be invalid. The report can be provided in electronic and/or paper form, and output from the gaming machine or a suitable data processing device on the network, such as a printer, for review and further determinations.

In FIG. 4, the security controller 420 can be further configured to provide secondary verification methods based on user input seeds to return a verification result corresponding to control programs residing in the server module 220 or client module 208 of one or more gaming machines. In one embodiment, security controller 420 is further configured to generate and record a log entry on a suitable storage medium when individual data, files, code, and/or software modules are added, removed, or altered. This includes programs to include control programs, data, graphics or sound information in one or more gaming machines. The log entry preferably has fields including the date and time of the action, identification of the component affected, identification of the individual performing the modification, and additional pertinent validation information. The log entry is preferably recorded twice: once on a storage medium in communication with the server module 220 of the device, and again on a computer or other logging device separate from the gaming machine, for later verification.

Returning to FIG. 3, the security controller 420 can be configured to perform the above-described operations by executing appropriate service executable files such as, for instance, gaming regulations executables to check compliance with gaming regulations.

In some embodiments, one or more nodes of the mesh network are in communication with a server associated with and/or operated by a state regulatory agency. In some states, such as Nevada, such regulatory agency servers are configured with regulatory control programs, executable to provide authentication and security services for compliance with particular regulations of the state. In one embodiment, the authentication and verification operations described herein include a sequence in which controllers situated at one or more nodes of the mesh network, such as security controller 420, are configured to send a message to the regulatory agency server, requesting permission to establish a communications path for authentication purposes. Such can be enabled, for instance, when a weakness or problem associated with performing the authentication procedures described above entirely within the mesh network is detected. When the regulatory agency server grants such permission, a communications path is established between the node(s) and the server, and one or more of the specific state's gaming regulations are applied as operations of the authentication processes described herein. Individual authentication operations unique to a particular state can be achieved by executing gaming regulatory control programs situated on the state's regulatory agency server.

In some implementations, it is desirable to monitor and control gaming machine operations and interactions between the gaming machines in view of the strengths and limitations of some mesh network capabilities. For instance, some mesh networks operate at a lower bandwidth than dedicated systems. In these implementations, as shown in FIG. 4, one or more gaming machines in the network 104 can be constructed to include an operations controller 452 situated in the server module 220 and configured to both monitor real-time mesh system parameters and operational characteristics and, accordingly, adjust operational functions of one or more gaming machines in the network. In one implementation, individual gaming machines in the network each include a separate operations controller 452 to provide these services, while, in another embodiment, a dedicated one of a plurality of machines provides this service for the various machines.

In one embodiment, the operations controller 452 is configured to monitor real-time mesh network conditions with designated metrics. When application of these metrics to the monitored network conditions yields an unsatisfactory value, for instance, when it is determined that the network speed is too slow, and adjustment condition is triggered, causing the operations controller to provide for, prioritize, and, when desired for the particular implementation, limit gaming machine operations accordingly. For example, to compensate for the unsatisfactory network condition, operations controller 452 can send a signal to the master gaming controller 212 instructing the controller to maintain certain machine operations deemed critical to maintaining the machine online, e.g., such as memory, processor, player input/output, and other operations. By the same token, other operations of one or gaming machines deemed unessential to basic gaming machine functionality, e.g., candle, sounds, lights, etc. could be cut back or suspended temporarily by operations controller 452 while the mesh network system dynamically adjusts.

One example of a gaming-related service enhanced by aspects of the present invention is progressive bonusing. Progressive bonusing is enhanced because any group or subset of gaming machines can be designated as progressive participants. High-speed connections between machines on the mesh network allow players to connect nearly instantaneously. In addition, new and different types of progressive bonusing can be implemented on the mesh network. Such bonusing can include event-based progressives, contribution-oriented progressives, and combinations thereof. Any such progressive bonusing implementation is configurable. In one example, a first group of machines in the network participates in the same progressive jackpot, and a second group, e.g., a subset of the first group in a certain area of the casino, participates in another progressive jackpot. Configuration can be automatic and be based on a variety of factors, including geographic location or network location of the machines at which players are located.

Desired levels of redundancy can be achieved using the techniques described herein. Few too many different nodes in the network can be provided with copies of the same information, depending on the desired level of redundancy, e.g. 5%, 10%, 50%, 100%. Thus, for example, player tracking system executables and/or data can be stored in a plurality of designated gaming machines. If any one those machines powers down, goes offline, or is otherwise inaccessible, others of the designated gaming machines can still respond to requests and provide all of the player tracking information. Such can be achieved without the expense of bulky disk drives, storage farms, and server arrays. Applying principles of the present invention, the desired redundancy and quick data access/retrieval can be achieved using mainly existing hardware at the gaming machines.

Another benefit provided by embodiments of the present invention is speed of access. If one gaming machine needs certain data, the gaming machine is operable to send a request message for the data to all or a designated group of other machines on the network. Responsive to receiving such a request, a voting scheme can be performed amongst the other gaming machines to determine the order in which the machines will respond. The cumulative time needed to send the request, perform the voting scheme, and deliver the data to the requesting gaming machine is minimal.

In some embodiments of the present invention, separate certifications of the respective services provided across the mesh network of gaming machines are performed by appropriate regulators. Preferably, each service provided at the various machines is certified apart from game approval. In this way, there can be multiple certification approvals for each gaming machine. This is beneficial in the global certification scheme, as it is consequently not necessary to re-run testing for all of the machines on a casino floor. Such certification approvals are preferably managed by a single device, so people can validate that the gaming machine and its services have been approved by a gaming regulator and not modified.

Gaming machine hardware and software, server and other data processing hardware and software, and supporting network architecture and infrastructure, is described in LeMay et al., U.S. patent application Ser. No. 11/595,774, titled "METHOD AND APPARATUS FOR INTEGRATING REMOTELY-HOSTED AND LOCALLY RENDERED CONTENT ON A GAMING DEVICE," filed Nov. 10, 2006, which is hereby incorporated by reference in its entirety for all purposes. Such hardware, software and network resources can be implemented to support the various inventive methods, apparatus, and systems disclosed herein.

Although the foregoing present invention has been described in detail by way of illustration and example for purposes of clarity and understanding, it will be recognized that the above described present invention may be embodied in numerous other specific variations and embodiments without departing from the spirit or essential characteristics of the present invention. Certain changes and modifications may be practiced, and it is understood that the present invention is not to be limited by the foregoing details, but rather is to be defined by the scope of the appended claims.

What is claimed is:

1. A method for implementing one or more services at a gaming device in a mesh network having a plurality of network nodes, the method comprising:
   providing, via one or more client controllers, play of one or more games of chance responsive to receiving a wager from a player at a player interface;
   providing communications at a network node with the mesh network via a mesh network interface, the mesh network interface configured to transmit data to and receive data from a further gaming device of a plurality of gaming devices at associated network nodes via a selected data path from a plurality of possible data paths the further gaming device, wherein the selected data path is selected based on congestion levels of the plurality of possible data paths;
   receiving, via one or more server controllers, a data update signal;
   receiving, via the one or more server controllers, one or more updated gaming service data files;
   storing, responsive to receipt of the data update signal, the one or more updated gaming service data files in a storage medium as at least a portion of data of a service provided in a wagering environment, said service being distinct from the play of the one or more games of chance, the gaming service data files being independent of game play data for wagering on a game of chance; and
   executing, via the one or more controllers, a gaming service executable file to provide the gaming service and process the one or more updated gaming service data files, the gaming service executable file being independent of one or more files executable to provide play of the one or more games of chance at any of the gaming devices; and
   transmitting, responsive to receipt of the data update signal, the one or more updated gaming service data files to a designated further one or more of the gaming devices via the mesh network interface, the one or more updated gaming service data files for storage at the designated further one or more gaming devices while also being stored in the storage medium.

2. A gaming device for implementing one or more services in a mesh network having a plurality of network nodes, the gaming device comprising:
   a player interface;
   one or more client controllers configured to provide play of one or more games of chance responsive to receiving a wager from a player at the player interface;
   a mesh network interface configured to provide communications at a network node with the mesh network, the mesh network interface configured to transmit data to and receive data from a further gaming device of a plurality of gaming devices at associated network nodes via a selected data path from a plurality of possible data paths to the further gaming device, wherein the selected data path is selected based on congestion levels of the plurality of possible data paths;

a storage medium storing a gaming service executable file and gaming service data files, the gaming service executable file being independent of one or more files executable to provide play of the one or more games of chance at any of the gaming devices and the gaming service data files being independent of game play data for wagering on the one or more games of chance at any of the gaming devices; and one or more server controllers configured to:
receive a data update signal;
receive one or more updated gaming service data files;
store, responsive to receipt of the data update signal, the one or more updated gaming service data files in the storage medium;
execute the gaming service executable file to provide the gaming service and process the one or more updated gaming service data files; and
transmit, responsive to receipt of the data update signal, the one or more updated gaming service data files to a designated further one or more of the gaming devices via the mesh network interface for storage at the designated further one or more gaming devices while also being stored in the storage medium.

3. The gaming device of claim 2, wherein the one or more server controllers are further configured to:
receive one or more updated gaming service executable files,
store, responsive to receipt of the data update signal, the one or more updated gaming service executable files in the storage medium, and
transmit, responsive to receipt of the data update signal, the one or more updated gaming service executable files to a second designated further one or more of the gaming devices via the mesh network interface for storage at the second designated further one or more gaming devices while also being stored in the storage medium; and
wherein the gaming service executable file or the one or more updated gaming service executable files include one or more items of executable data selected from the group consisting of: player tracking executables, accounting executables, security executables, subscription executables, scheduling executables, authentication executables, cashless gaming executables, ticketing service executables, floor management executables, customer relations management (CRM) executables, virtual host executables, player preference executables, harm minimization executables, and game management executables.

4. The gaming device of claim 2, wherein the one or more server controllers are further configured to:
receive one or more updated gaming service executable files,
store, responsive to receipt of the data update signal, the one or more updated gaming service executable files in the storage medium, and
transmit, responsive to receipt of the data update signal, the one or more updated gaming service executable files to a second designated further one or more of the gaming devices via the mesh network interface for storage at the second designated further one or more gaming devices while also being stored in the storage medium; and wherein the gaming service executable file or one or more updated gaming service executable files include one or more items of executable data selected from the group consisting of: bonusing executables, progressive executables, and tournament executables.

5. A gaming system for implementing services over a plurality of gaming devices in a mesh network, the system comprising:
a plurality of gaming devices situated at respective network nodes of the mesh network, each of the plurality of gaming devices including:
a player interface;
one or more client controllers configured to provide play of one or more games of chance responsive to receiving a wager from a player at the player interface;
a mesh network interface configured to provide communications at a respective network node with the mesh network, the mesh network interface configured to transmit data to and receive data from a further gaming device of the plurality of gaming devices at a further associated network node via a selected data path from a plurality of possible data paths to the further gaming device, wherein the selected data path is selected based on congestion levels of the plurality of possible data paths;
a storage medium storing a gaming service executable file and gaming service data files, the gaming service executable file being independent of one or more files executable to provide play of the one or more games of chance at any of the gaming devices and the gaming service data files being independent of game play data for wagering on the one or more games of chance at any of the gaming devices; and
one or more server controllers configured to:
receive a data update signal;
receive one or more updated gaming service data files;
store, responsive to receipt of the data update signal, the one or more updated gaming service data files in the storage medium;
execute the gaming service executable file to provide the gaming service and process the one or more updated gaming service data files; and
transmit, responsive to receipt of the data update signal, the one or more updated gaming service data files to a designated further one or more of the gaming devices via the mesh network interface for storage at the designated further one or more gaming devices while also being stored in the storage medium.

6. The system of claim 5, wherein the one or more server controllers are further configured to:
receive one or more updated gaming service executable files,
store, responsive to receipt of the data update signal, the one or more updated gaming service executable files in the storage medium, and
transmit, responsive to receipt of the data update signal, the one or more updated gaming service executable files to a second designated further one or more of the gaming devices via the mesh network interface for storage at the second designated further one or more gaming devices while also being stored in the storage medium; and
wherein the one or more server controllers are further configured to determine whether the one or more updated gaming service executable files or the one or more updated gaming service data files comply with one or more gaming regulations.

7. The system of claim 6, wherein determining whether the one or more updated gaming service executable files or the one or more updated gaming service data files comply with the one or more gaming regulations includes validation of the one or more updated gaming service executable files or the one or more updated gaming service data files.

8. The system of claim 6, wherein the one or more server controllers are further configured to send a message to one or more of the plurality of gaming devices in the mesh network, the message including instructions to suspend or disable play of the one or more gaming devices when the one or more updated gaming service executable files or the one or more updated gaming service data files do not comply with the one or more gaming regulations.

9. The system of claim 6, wherein the one or more server controllers are configured to generate and output a report indicating results of one or more validation operations performed on the one or more updated gaming service executable files or the one or more updated gaming service data files.

10. The system of claim 6, wherein the gaming service executable file and the one or more updated gaming service executable files include one or more items of executable data selected from the group consisting of: player tracking executables, accounting executables, security executables, subscription executables, scheduling executables, authentication executables, cashless gaming executables, ticketing service executables, floor management executables, customer relations management (CRM) executables, virtual host executables, player preference executables, harm minimization executables, game management executables, third party service executables, and gaming regulation executables.

11. The system of claim 6, wherein the gaming service executable file and the one or more updated gaming service executable files include one or more items of executable data selected from the group consisting of: bonusing executables, progressive executables, and tournament executables.

12. The system of claim 5, wherein the one or more server controllers are configured to:
monitor operational characteristics of the mesh network, and
adjust operational functions of one or more of the plurality of gaming devices in the mesh network in accordance with the monitored operational characteristics.

13. The system of claim 12, wherein adjusting the operational functions includes determining a priority of the operational functions according to gaming device operability.

14. The system of claim 12, wherein adjusting the operational functions includes sending a message to the one or more gaming devices, the message including instructions to suspend one or more designated operational functions.

15. The system of claim 5, wherein the one or more client controllers include a master gaming controller.

16. The system of claim 5, wherein the one or more client controllers are configured to store theme data in a memory device.

17. The system of claim 5, wherein the one or more client controllers are configured to store preference data in a memory device.

18. The system of claim 17, wherein the preference data includes one or more items selected from the group consisting of: color data, brightness data, animation data, style data, and graphics data.

19. The system of claim 17, wherein the preference data includes game preference data.

20. The system of claim 5, wherein the gaming service data files and the one or more updated gaming service data files include one or more items of data selected from the group consisting of: player tracking data, meter history data, accounting data, security event data, subscription data, scheduling data, protocol data, authentication data, cashless gaming data, ticketing service data, floor management data, customer relations management (CRM) data, virtual host data, player preference data, harm minimization data, and game management data.

21. The system of claim 5, wherein the gaming service data files and the one or more updated gaming service data files include one or more items of data selected from the group consisting of: bonusing data, progressive data, and tournament data.

22. The system of claim 5, wherein a network node is associated with a respective geographic location.

23. The system of claim 5, wherein a network node is associated with a respective network address.

24. The system of claim 5, wherein a plurality of the network nodes are coupled via a wired connection.

25. The system of claim 5, wherein a plurality of the network nodes are coupled via a wireless connection.

26. The system of claim 5, wherein a first one or more of the network nodes are geographically situated in a first gaming property.

27. The system of claim 26, wherein a second one or more of the network nodes are geographically situated in a second gaming property.

28. The system of claim 27, wherein the first gaming property and the second gaming property are situated in different cities, states, or countries.

* * * * *